(12) United States Patent
Sato et al.

(10) Patent No.: US 6,368,030 B1
(45) Date of Patent: *Apr. 9, 2002

(54) SOLID END MILL (75) Inventors: Katsuhiko Sato; Yoshihiko Kimura, both of Ibaraki-ken (JP)

(73) Assignee: Mitsubishi Materials Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/543,414

(22) Filed: Apr. 5, 2000

(30) Foreign Application Priority Data

Apr. 5, 1999 (JP) .......................... 11-098216

(51) Int. Cl.$^7$ .............................. B23B 27/22
(52) U.S. Cl. .............................. 407/53; 407/54; 407/60; 407/61
(58) Field of Search .............................. 407/53, 54, 60, 407/61, 114, 115, 116; 408/230

(56) References Cited

U.S. PATENT DOCUMENTS

| | | | | |
|---|---|---|---|---|
| 2,322,894 A | * | 6/1943 | Stevens | ........................ 408/230 |
| 2,966,081 A | * | 12/1960 | Kallio | ........................ 408/230 |
| 4,065,224 A | * | 12/1977 | Siddall | ........................ 408/230 |
| 4,810,136 A | * | 3/1989 | Paige | ........................ 407/54 |
| 5,460,464 A | | 10/1995 | Arai et al. | |
| 5,868,531 A | * | 2/1999 | Sandford | ........................ 407/114 |
| 6,042,309 A | * | 3/2000 | Sandford | ........................ 407/114 |

FOREIGN PATENT DOCUMENTS

| | | | |
|---|---|---|---|
| FR | 1190274 | * 10/1959 | ................ 408/230 |
| JP | 7-204921 | 8/1995 | |
| JP | 8-112710 | 5/1996 | |
| JP | 9-309020 | 12/1997 | |
| JP | 11-216609 | 8/1999 | |

* cited by examiner

Primary Examiner—Henry Tsai
(74) Attorney, Agent, or Firm—Oblon, Spivak, McClelland, Maier & Neustadt, P.C.

(57) ABSTRACT

A solid end mill is provided which can prolong the useful life of the tool, without any adhesion to the work material, even aluminum or similar material, during a or cutting or drilling operation. The solid end mill includes a chip discharge flute, which is formed in the outer periphery of a nearly cylindrical tool main body. The nearly cylindrical tool main body rotates around a central longitudinal axis. A cutting edge is formed at a ridge portion on the outer periphery of the tool main body. The cutting edge is adjacent to a wall surface constituting a rake face of the chip discharge flute. The rake face faces in the tool rotational direction. A convex portion may be formed so as to be adjacent to and raised from a concavely curved portion. The concavely curved portion stretches to the cutting edge and is formed between the flute bottom of the chip discharge flute and the cutting edge.

7 Claims, 6 Drawing Sheets

SOLID END MILL

BACKGROUND OF THE INVENTION

1. Technical Field of Invention

The present invention generally relates to a solid end mill and more particularly, to a solid end mill having a tool main body with cutting edges at ridge portions formed on an outer periphery of the tool main body, wherein a chip discharge flute is formed between adjacent cutting edges so that the solid end mill may be used in slot or shoulder milling of work materials.

2. Discussion of Background

Figure 11:
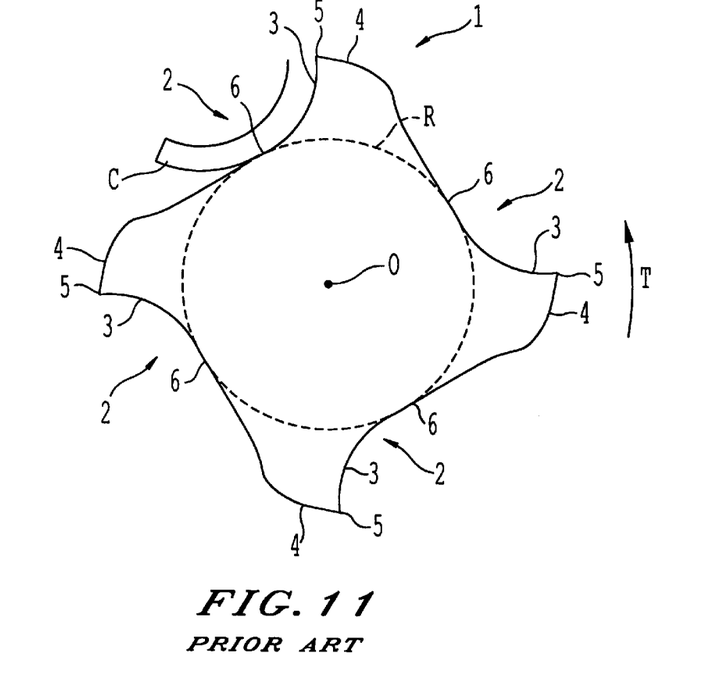
FIG. 11 is a prior art cross-sectional view showing the tool main body of the conventional solid end mill.

A tool main body 1 of a conventional solid end mill is shown in cross-section in FIG. 11 and the tool main body 1 is nearly cylindrical. The cross-section is taken at some point along the length of the end mill so as to be perpendicular to the central longitudinal axis O of the tool main body 1. The solid end mill has four teeth (i.e., the ridge portions with cutting edges) alternating with four chip discharge flutes 2. The four teeth are each formed at equally spaced intervals with respect to each other so as to protrude from the outer periphery of the tool main body 1. The four chip discharge flutes 2 are also each formed at equally spaced intervals with respect to each other around the outer periphery of the tool main body 1. Each chip discharge flute 2 of the tool main body 1 has a wall surface facing a tool rotational direction T. The wall surface facing the tool rotational direction T forms a rake face 3. The cutting edges 5 are formed along the tip of the ridge portions where the rake face 3 intersects the flank face 4. Each of the ridge portions extends radially outwardly from a core thickness circle R (i.e., the outer cylindrical outline) of the tool main body 1.

The rake face 3 forms a concavely curved surface adjacent to the flute bottom 6, as is shown in FIG. 11. The rake face 3 meets the flute bottom 6 of the chip discharge flute 2 at a location where the chip discharge flute 2 is depressed so that the flute bottom 6 of the chip discharge flute 2 is tangent to the core thickness circle R of the tool main body 1. Thus, the portion of the chip discharge flute 2 from the flute bottom 6 to the cutting edge 5 engages the outer surface of the chip C so that the flank face 4 of the next cutting edge 5 is stretched in the tool rotational direction T when the rake face 3 is stretched. In addition, the chip discharge flute 2 is generally formed so as to curve towards the opposite direction of the tool rotational direction T of the tool main body 1. In other words, the chip discharge flute 2 extends towards the back end of the tool main body 1. Consequently, a cutting edge 5 is formed spirally around the central longitudinal axis O of the tool main body 1.

In the conventional solid end mill of the structure as discussed above and as shown in FIG. 11, the chip C, which is generated by the cutting edge 5 at the time of cutting, reaches the flute bottom 6 by sliding or rubbing on all of the surfaces of the rake face 3, including along the concavely curved portion of the rake face 3. The flute bottom 6 is curled during the sliding or rubbing of the surfaces of the rake face 3 so that a chip C is discharged from the chip discharge flute 2, as shown in FIG. 11. However, the type of material that the end mill is used to cut or drill through influences the results of the cutting or drilling. For example, when the work material to be cut or drilled through is aluminum, it is highly likely that adhesion of aluminum will occur on the rake face due to the heat of friction generated during the sliding or rubbing of the chip C on all of the surfaces of the rake face 3. Consequently, the useful life of the tool may often be unnecessarily shortened.

The present invention has been made with the above-described problems of the prior art in mind, and aims to provide a solid end mill for prolonging the useful life of the tool main body, by preventing adhesion, even if the work material being cut or drilled through is aluminum.

SUMMARY OF THE INVENTION

In order to solve the above-described problems of the prior art, the present invention provides a solid end mill, which includes: a tool main body having a central longitudinal axis, wherein the tool main body is nearly cylindrical and the tool main body rotates around the central longitudinal axis thereof; a chip discharge flute formed at an outer periphery of the tool main body; a cutting edge formed at a ridge portion on the outer periphery of the tool main body, wherein a wall surface adjacent to the cutting edge is a rake face of the chip discharge flute and the wall surface faces the tool rotational direction. In a first embodiment of the present invention, a convex portion is formed on the rake face so as to extend radially outwardly from an adjacent concavely curved portion, wherein the rake face stretches from the cutting edge to the flute bottom of the chip discharge flute. The convex portion may be any one of many different shapes, such as rounded, triangular, trapezoidal, etc. In a second embodiment of the present invention, a concave portion is formed adjacent to the concavely curved portion of the rake face, wherein the rake face stretches from the cutting edge to the flute bottom of the chip discharge flute.

In operation of the first embodiment of the present invention, a chip contacts the convex portion of the rake face of the solid end mill, and then passes over the concavely curved portion of the rake face in the solid end mill, so that a clearance is generated between the chip and the rake face. Thus, the heat of friction, caused by sliding or rubbing of the chip, is inhibited and adhesion is prevented. In addition, since the convex portion is formed at the bottom of the chip discharge flute (i.e., the location stretching from the flute bottom of the rake face to the concavely curved portion of the rake face, the concavely curved portion being adjacent the cutting edge), a clearance is created at a location between the convex portion and flute bottom in order for the heat of friction due to sliding or rubbing of the chip to be controlled much more certainly.

DETAILED DESCRIPTION OF THE PREFERRED EMBODIMENTS

Figure 1:
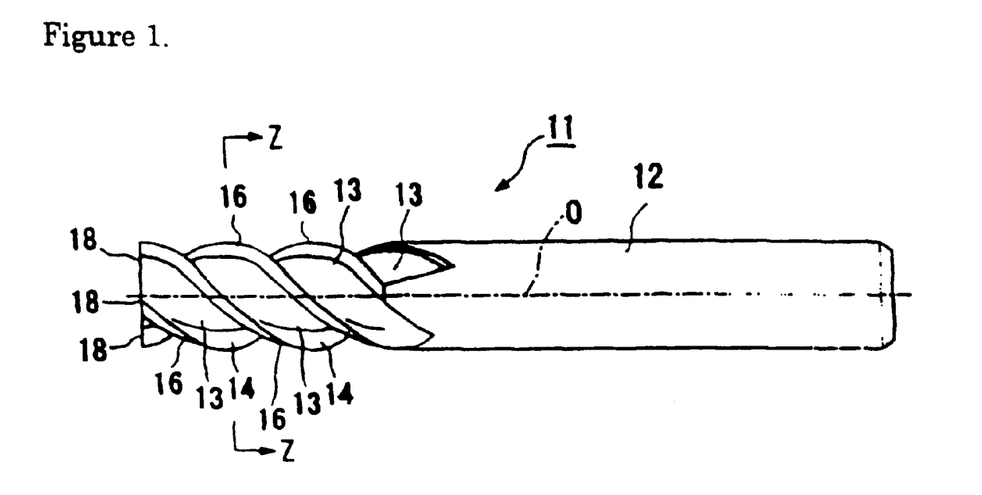
FIG. 1 is a side elevational view showing a first embodiment of the solid end mill of the present invention.

Referring to any of FIG. 1, FIG. 3, or FIG. 4, the first embodiment of the solid end mill of the present invention will be explained. In the first embodiment of the solid end mill, the tool main body 11 is made of a hard material, such as a cemented carbide, etc., and is formed to be nearly cylindrical. The rear end of the tool main body 11 is a shank 12 and the outer periphery of the tip end of the tool main body 11 has four chip discharge flutes 13. The chip discharge flutes 13 are formed at evenly spaced intervals with respect to each other along the outer periphery of the tool main body 11. The four chip discharge flutes 13 each have a flute bottom 19, which is tangent to a core thickness circle R of the cylindrical tool main body 11. The four chip discharge flutes 13 each end in a flank face 15 on a rear side of a ridge portion of the tool main body 11 and a rake face 14 on a front side of a ridge portion of the tool main body 11. The rake face 14 may be made up of a convex portion 21 and a concavely curved portion 20.

Figure 2:
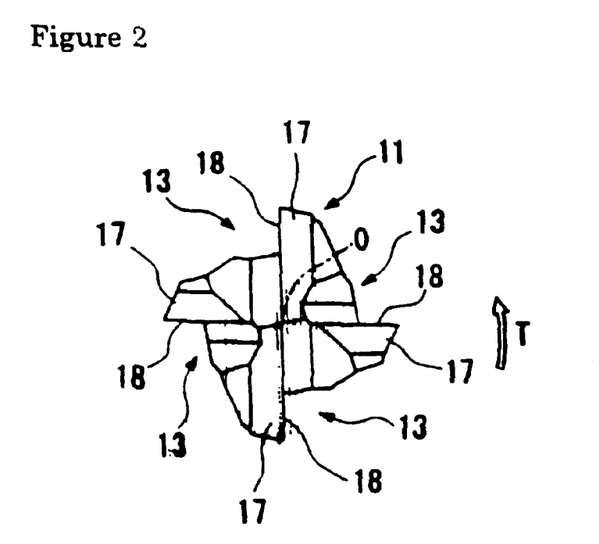
FIG. 2 is a front elevational view of the tip of the tool main body of the first embodiment of the solid end mill shown in FIG. 1.

The rake face 14 of the chip discharge flutes 13 is a wall surface which faces the tool rotational direction T. A cutting edge 16 is formed spirally around the central longitudinal axis O at the ridge portion where the rake face 14 intersects the flank face 15 (i.e., the wall surface on the rear side of the ridge portion and stretching towards the rake face 14). In addition, on the tip end of each chip discharge flute 13, the bottom cutting edge 18 is formed at the ridge portion where the rake face 14 intersects the top flank face 17 of the tool main body 11. The rake face 14 intersects the top flank face 17 of the tool main body 11 by extending along a diameter thereof from the central longitudinal axis O towards the outer periphery of the tool main body 11, as shown in FIG. 2.

Figure 3:
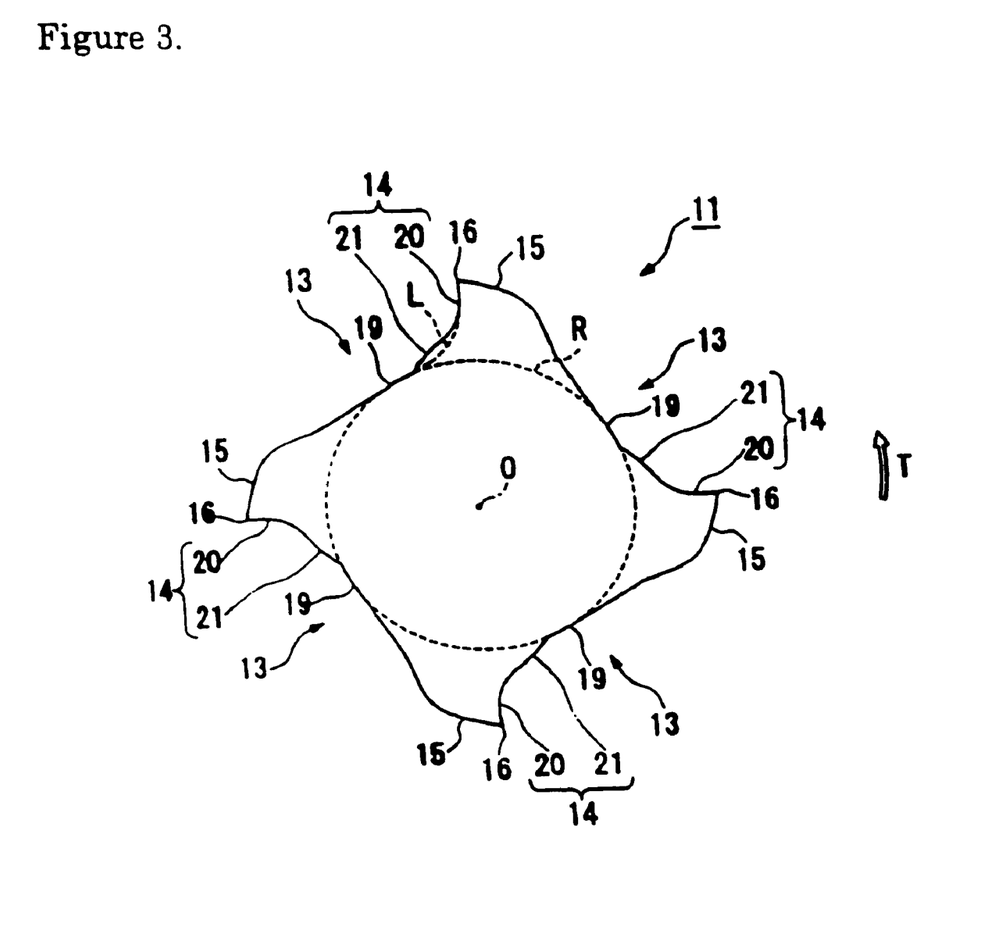
FIG. 3 is a cross-sectional view taken through line Z—Z of FIG. 1 and showing first convex portion 21.

Each of the chip discharge flutes 13 is formed so as to have a flute bottom 19 of a convex arc shape at a cross section perpendicular to the central longitudinal axis O of the tool main body 11, as shown in FIG. 3. The flute bottom 19 of the chip discharge flute 13 extends radially outwardly from the periphery of the tool main body 11 and stretches towards the flank face 15 of the next cutting edge 16 in the tool rotational direction T. As opposed to the chip discharge flute 13 adjacent to the rake face 14, which stretches from the flute bottom 19 in a direction opposite to the tool rotational direction T, the concavely curved portion 20 is formed at the outer periphery so as to stretch to the cutting edge 16 similar to the tool main body 1 of the conventional solid end mill. A convex portion 21 extends radially outwardly from a virtual cross-section L (i.e., the cross section of the rake face 3 of the conventional end mill shown in FIG. 11). The convex portion 21 extends outwardly from the virtual cross-section L so as to stick out from the concavely curved portion 20. In addition, the core thickness circle R of the tool main body 11, as shown in FIG. 3, is tangent to the flute bottom 19.

Figure 4:
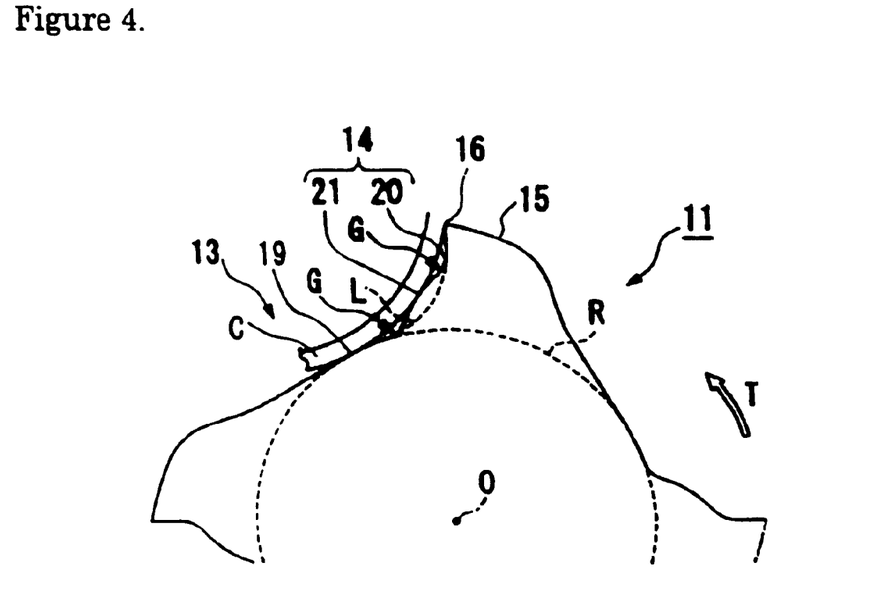
FIG. 4 is a partial cross-sectional view showing the outflow status of the chips C of FIG. 3 over the first convex portion 21.

The first embodiment of the solid end mill as shown in FIGS. 3 and 4 has a rake face 14 which includes a convex portion 21 adjacent to a concavely curved portion 20. The concavely curved portion 20 has a (roughly overall) big radius of curvature in cross-section perpendicular to the central longitudinal axis O. Furthermore, at a side on which the flute bottom 19 is located, the convex portion 21 intersects the flute bottom 19 when the convex portion 21 is flexed so as to be convex in shape to the flute bottom 19. In addition, at the concavely curved portion 20 on the side on which the rake face 14 is located, the convex portion 21 is bent to be made slightly concave to stretch smoothly to the concavely curved portion 20. In addition, the convex portion 21 may be made concave at a side on which the flute bottom 19 is located, to stretch smoothly to the flute bottom 19. In this way, the first embodiment of the present invention has a convex portion 21 formed so as to be kept along the overall length of the chip discharge flute 13 as shown in FIG. 3, except that adjacent the concavely curved portion 20 adjacent to the cutting edge 16, the convex portion 21 is continuously formed in a spiral shape on the rake face 14 along the ridge portion.

When a solid end mill is formed in this way, a chip C is generated by the cutting edge 16 during a cutting or drilling operation. The chip C contacts the convex portion 21, while it is sliding along the rake face 14 from the cutting edge 16 to the flute bottom 19, as shown in FIG. 4. The chip C must surmount the convex portion 21 in order to reach the flute bottom 19. A clearance G is generated between the chip C and the rake face 14, when the chip C contacts the convex portion 21. Due to the clearance G, the heat of friction, which is usually created when the chip C slides or rubs along the rake face 14, is inhibited, and adhesion is prevented from occurring. Thus, even during the machining of aluminum or similar materials, adhesion of the work materials onto the rake face 14 can be prevented by use of the clearance G to inhibit heat of friction cause by the sliding or rubbing of the chip C. Consequently, the useful life of the solid end mill, which is shortened by adhesion, is stabilized in order to promote cutting or drilling for longer periods of time.

The convex portion 21 of the first embodiment of the solid end mill of the present invention may also be formed by flexing the rake face 14 so as to create the convex shape of the convex portion. The flexing of the rake face 14 to create the convex shape of the convex portion 21 causes the flute bottom 19 of the chip discharge flute 13 to intersect the rake face 14 so that a clearance G is generated when chips C contact the convex portion 21. Thus, heat of fraction is inhibited between the convex portion 21 and the flute bottom 19 so that adhesion on the rake face 14 can be more certainly prevented and the useful life of the tool main body 11 is not shortened.

Since the heat of friction generated by sliding or rubbing of the chip C on the rake face 14 is inhibited with the inhibition of the contact of the chip C to the rake face 14 by generating the clearance G between the chip C and the rake face 14, it becomes possible to reduce the rotational driving force of the tool main body 11 during the cutting or drilling operations of the end mill. Since the clearance G may be generated by doing wet cutting, for example, a cutting fluid is fed during the cutting or drilling operation, and the cutting fluid is fed surely to near the cutting edge via the clearance G. In this way, heat of friction is inhibited more surely and adhesion is prevented. Furthermore, since chips C will flow out so as to pass over the convex portion 21, the flow of chips C can be made linear, as compared with the conventional case where the chips flow along the concave rake face, and as a result, the chips C are more effectively discharged.

It should be noted that the present invention was applied to a four-toothed solid end mill (i.e., four chip discharge flutes 13 formed at the tip end of the tool main body 11 and four cutting edges 16 formed at the tip of the ridge portions where the rake face 15 meets the flank face 15 on the outer periphery of the tool main body 11). However, the number of cutting edges 16 is not limited to four, and the number of cutting edges may be any of two, three, five, six, etc. Moreover, in the first embodiment, the convex portion 21 is formed continuously in the direction of the central longitudinal axis O, like a convex belt on the rake face 14 separated from the cutting edge 16 by only the concavely curved portion 20. However, the convex portion 21 may be formed so as to be dotted in the direction of the central longitudinal axis O along the cutting edge 16, since the chips C generated by the cutting edge 16 flow on the rake face 14 creating a certain grade of width along the cutting edge 16.

Figure 5:
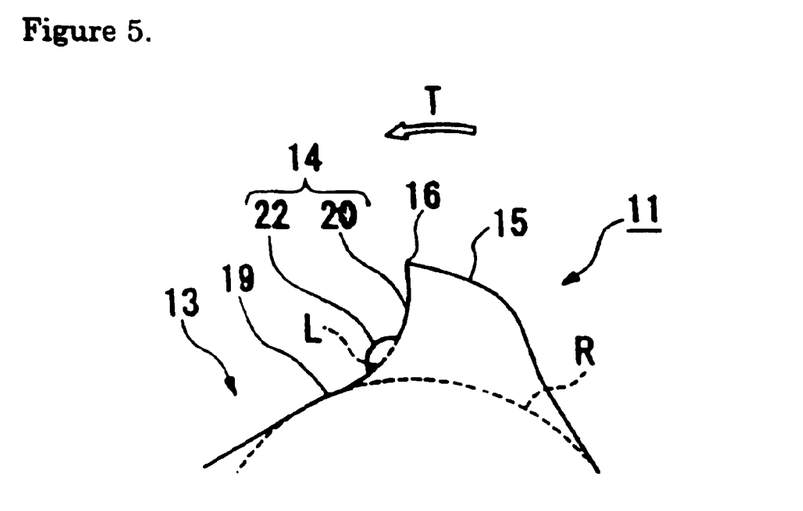
FIG. 5 is a partial cross-sectional view showing a modified convex portion 22 from the convex portion 21 of the first embodiment of the solid end mill of FIGS. 3 and 4.
Figure 9:
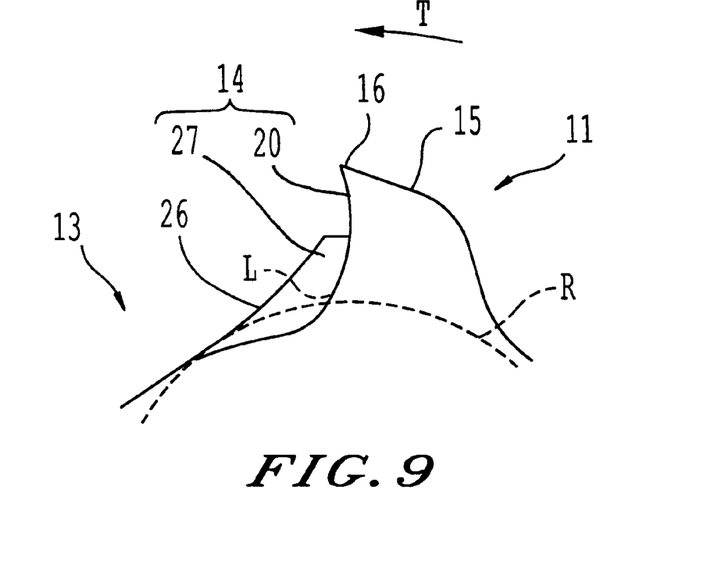
FIG. 9 is a partial cross-sectional view showing yet still another modified convex portion 27 from the convex portion 21 of the first embodiment of the solid end mill of FIGS. 3 and 4.

Both FIGS. 5 and 9 show modifications to the first embodiment of the solid end mill of the present invention. The same element numbers have been given to the structural elements of FIGS. 5 and 9 which are common with the structural elements of the first embodiment shown in FIGS. 1 and 4, and an explanation of those common structural elements is omitted here. In the modified examples shown in FIGS. 5 and 9, the flute bottom 19 of the chip discharge flute 13 becomes a concavely curved surface 20 stretching smoothly to the extended surface of the concavely curved portion 20 of the rake face 14, like the conventional solid end mill in FIG. 11, except that the convex portion 27 of FIG. 9, is formed so that it may contact the core thickness circle R at the flute bottom 26 of the tool main body 11.

However, in the modified example of FIG. 5, a convex portion 22, which has a smaller radius of curvature than the convex portion 21 of the first embodiment shown in FIGS. 3 and 4, is formed between the concavely curved portion 20 adjacent the cutting edge 16 of the rake face 14 and the flute bottom 19 in the cross-section perpendicular to the central longitudinal axis O. The convex portion 22 is flexed so that the concavely curved portion 20, on the side of the rake face 19 on which the cutting edge 16 is located, intersects the flute bottom 19, on the side of the rake face 19 on which the convex portion 22 is located.

Figure 6:
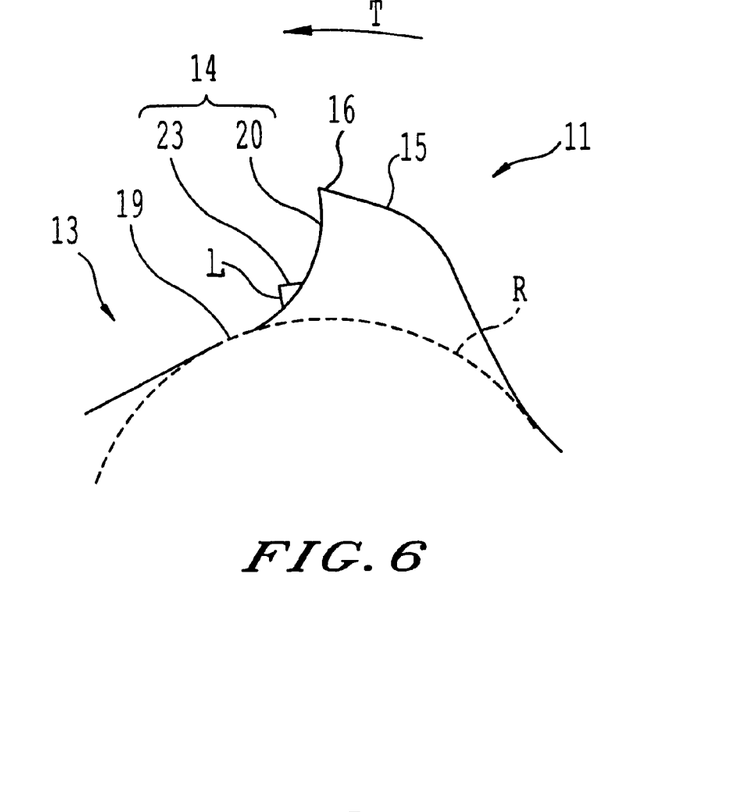
FIG. 6 is a partial cross-sectional view showing another modified convex portion 23 from the convex portion 21 of the first embodiment of the solid end mill of FIGS. 3 and 4.

In the modified example of FIG. 6, the convex portion 23 has a triangular shape in cross section, which is formed by projecting one corner of the triangle.

Figure 7:
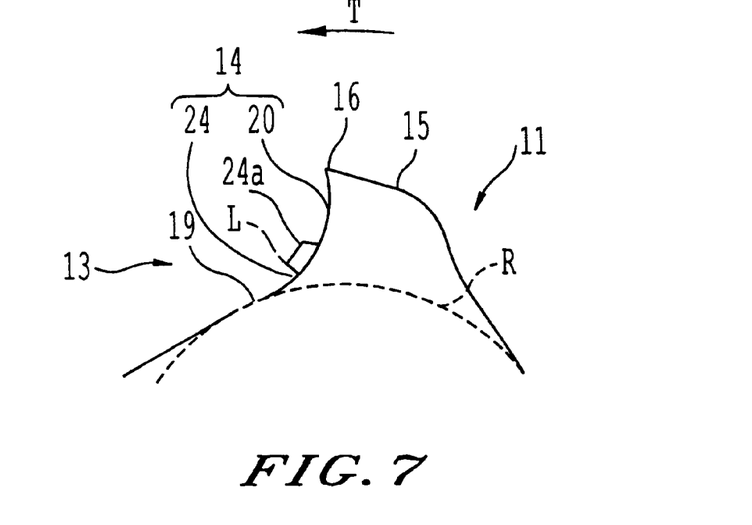
FIG. 7 is a partical cross-sectional view showing yet another modified convex portion 24 from the convex portion 21 of the first embodiment of the solid end mill of FIGS. 3 and 4.

In the modified example of FIG. 7, the convex portion 24 has the shape of an isosceles trapezoid in cross section, wherein the trapezoid has a width which becomes gradually narrower as it projects or extends from the rake face 14.

Figure 8:
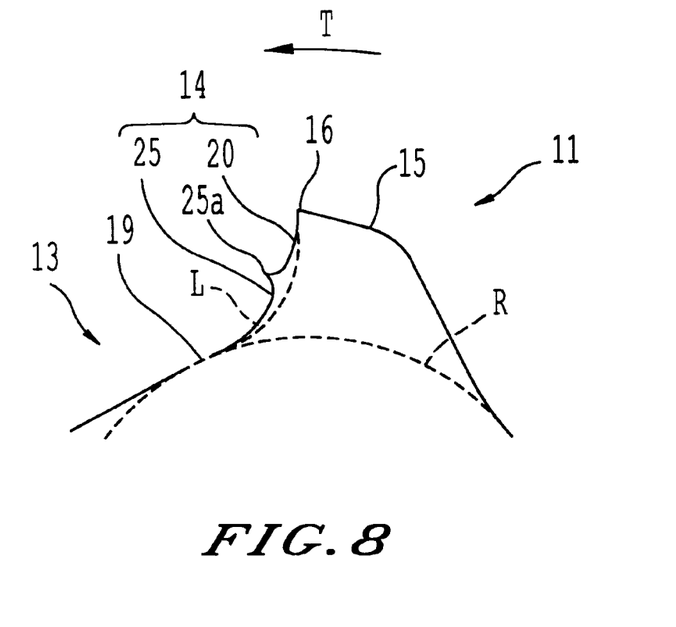
FIG. 8 is a partial cross-sectional view showing still another modified convex portion 25 from the convex portion 21 of the first embodiment of the solid end mill of FIGS. 3 and 4.

In the modified example of FIG. 8, the convex portion 25 formed on the rake face 14 is curved into a concave shape from the flute bottom 19 to the tip 25a of the convex portion 25 (i.e., where the convex portion 25 meets the concavely curved portion 20).

In the modified example of FIG. 9, the flute bottom 26 of the chip discharge flute 13 is formed to have a nearly flat surface tangent to the core thickness circle R of the tool main body 11 in the cross section perpendicular to the central longitudinal axis O. The flute bottom 26 is smoothly connected to the convex portion 27 before the convex portion 27 abruptly changes to a flat surface which intersects the concavely curved portion 20 of the rake face 14.

The solid end mills of the above-described modified examples have the same effectiveness in operation as the first embodiment having the convex portion 21. Moreover, in the modified examples of FIGS. 5, 6 and 8, since the contact areas between the chip C and the convex portions 22, 23 and 24, respectively, can be inhibited so as to be smaller than the contact areas of the chip C and convex portion 21 of the first embodiment, the heat of friction will still be small, and adhesion will be prevented much more certainly. In addition, in the modified examples of FIGS. 7 and 9, by using the flat surface 24a of the convex portion 24 or the flat surface of the flute bottom 26, respectively, the chip C can be more steadily guided in the predetermined direction and discharged more smoothly.

Figure 10A:
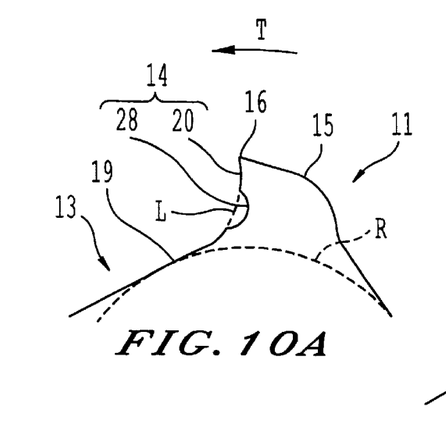
FIG. 10(a) is a partial cross-sectional view showing a second embodiment of the solid end mill of the solid end mill of the present invention having a first variation of a concave portion 28 (i.e., semi-circularly shaped) recessed into the concavely curved portion 20, instead of a convex portion, such as 21 (FIGS. 3 and 4), 22 (FIG. 5), 23 (FIG. 6), 24 (FIG. 7), 25 (FIG. 8), and 27 (FIG. 9), extending outwardly from the concavely curved portion 20.
Figure 10B:
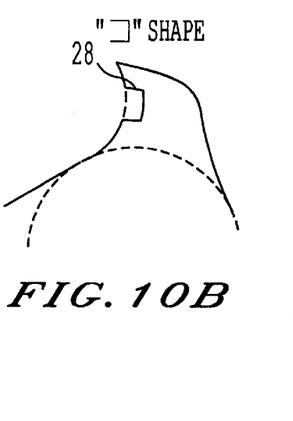
FIG. 10(b) is a partial cross-sectional view showing a second embodiment of the solid end mill of the solid end mill of the present invention having a second variation of the concave portion 28 (i.e., sideways "U" shaped) recessed into the concavely curved portion 20, instead of a convex portion, such as 21 (FIGS. 3 and 4), 22 (FIG. 5), 23 (FIG. 6), 24 (FIG. 7), 25 (FIG. 8), and 27 (FIG. 9), extending outwardly from the concavely curved portion 20.
Figure 10C:
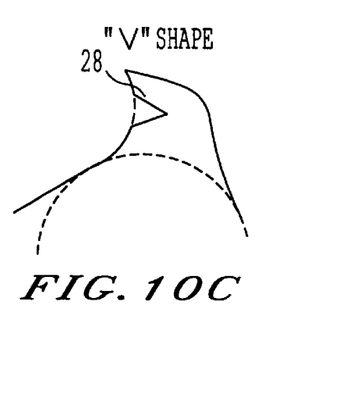
FIG. 10(c) is a partial cross-sectional view showing a second embodiment of the solid end mill of the solid end mill of the present invention having a second variation of the concave portion 28 (i.e., sideways "V" shaped) recessed into the concavely curved portion 20, instead of a convex portion, such as 21 (FIGS. 3 and 4), 22 (FIG. 5), 23 (FIG. 6), 24 (FIG. 7), 25 (FIG. 8), and 27 (FIG. 9), extending outwardly from the concavely curved portion 20.

Next, FIGS. 10(a), 10(b), and 10(c) show variations of the second embodiment of the solid end mill of the present invention. The same element numerals are given to the structural elements which are in common with the structural elements of the first embodiment of the solid end mill of the present invention and an explanation of those common structural elements is omitted here. In the first embodiment and all of its modified examples, in order to generate the clearance G between the chip C formed by the cutting edge 16 and the rake face 14, the convex portions 21–25 and 27 are made on the rake face 14 to generate the clearance G by means of the chips C contacting the convex portions 21–25 and 27, respectively. However, in the second embodiment, the concave portion 28 forms a depression or indentation in the concavely curved portion 20 which stretches to the cutting edge 16. The clearance G is generated between the chip and the concave portion 28.

Here, the concave portion 28 of the second embodiment is formed like the concavely curved portion 20, except that the arc-shape of the concave portion 28 has a smaller curvature radius than the radius of curvature of the concavely curved portion 20. An obtuse angle is formed where the concave portion 28 intersects the flute bottom 19 and another obtuse angle is formed where the concave portion 28 intersects the concavely curved portion 20. However, in the second embodiment, the concave portion 28 is formed along the entire length of the chip discharge flute 13, except the portion near the bottom edge 18 (i.e., the concave slot is twisted spirally of the rake face 14 along the cutting edge 16), similarly to the convex portion 21 in the first embodiment. Therefore, since the clearance is generated between the chip C and the rake face 14 by contacting the concave portion 28, heat of friction may be inhibited and adhesion prevented.

In addition, in the second embodiment, the concave portion 28 may be curved, as shown in FIG. 10(a), or may be more angular such as a sideways "U" shape (i.e., "]"), as shown in FIG. 10(b), or a "V" shape, as shown in FIG. 10(c). The sideways "U" shape and the "V" shape both their openings formed in the surface of the rake face 14. The sideways "U" shaped and the "V" shaped concave portions 28 may also have, formed therein, a convex portion 21–25, similar to those shown in the first embodiment and the modified examples of FIGS. 5–8. The sideways "U" shaped and the "V" shaped concave portions 28 may also have, formed between it and the flute bottom 19 or 26, a convex portion 21–25 and 27, similar to those shown in the first embodiment. Furthermore, in the first embodiment, or its modified examples, and the second embodiment, even though the concavely curved portion 20 is formed to stretch to the cutting edge 16 adjacent the rake face 14, the concavely curved portion 20 may act like a flat surface.

On the one hand, in the first embodiment, or its modified examples, and the second embodiment, or its modified examples, the tool rotational direction T is clockwise at the time of the cutting or drilling operation as seen from the rear end of the tool main body 11 where the shank 12 is formed. In other words, the solid end mill is a right-hand toothed end mill, which cuts work material in the clockwise direction as seen from the drive side, and also is a right twisting type, where the chip discharge flute 13 and cutting edge 16 are twisted in the direction of a right-hand screw. However, the present invention can also be applied to the solid end mill of the right-hand tooth and left twisting type, left-hand tooth and right twisting type, and left-hand tooth and left twisting type. Moreover, it is also applicable to a straight tooth type end mill, which does not have either a chip discharge flute or a cutting edge which is twisted. Moreover, in the first embodiment, or its modified examples, and the second embodiment, or its modified examples, explanation was given with respect to the case where the present invention was applied to a square end mill in which the cutting edge 16 and the bottom edge 18 have a square shape corner, as shown in FIGS. 1 and 2. However, the e present invention is also applicable to a tapered end m ill (i.e., the cutting edge 16 is a peripheral cutting edge which has a taper), a ball end mill (i.e., a spherical end cutting edge), or a radius end mill (i.e., a rounded corner), etc.

The effect of the present invention is to provide a convex portion, which is raised in comparison to the concavely curved portion stretching to the cutting edge, is formed between the flute bottom and the concavely curved portion. Conversely, the concave portion is formed so as to be depressed or indented into the concavely curved portion stretching to the cutting edge. With either the convex portion or the concave portion, a clearance is created between a chip, generated by a cutting edge, and a rake face, and the heat of friction due to sliding or rubbing of the chip on the rake face is inhibited so that adhesion is prevented, even if the work material to be cut or drilled through is aluminum or other similar material, and the useful life of the tool main body is prolonged.

We claim:

1. A solid end mill comprising:
   a tool main body being approximately cylindrical in cross-section with a cylindrical outer periphery being defined by a core thickness circle, having a central longitudinal axis, and being rotatable about said central longitudinal axis in a rotational direction;
   at least first and second cutting members extending radially outwardly from said core thickness circle of said tool main body, wherein each of said at least first and second cutting members forms a somewhat triangular shape having curved sides in cross-section;
   a chip discharge flute located radially outwardly of said core thickness circle of said tool main body between adjacent ones of said at least first and second cutting members, said chip discharge flute including a flute bottom being somewhat flat, located approximately tangent to said core thickness circle of said tool main body, and being connected to a wall surface constituting a rake face, wherein said rake face includes a convex portion adjacent to a concavely curved portion such that said wall surface would define an approximately smoothly curved surface from an end of said flute bottom to said concavely curved portion except for said convex portion extending radially outwardly therefrom; and
   a cutting edge formed at a ridge portion between said rake face of said chip discharge flute and a flank face of said cutting member.

2. The solid end mill of claim 1, wherein said convex portion has a convex shape selected from a group consisting of a somewhat irregular arc shape which has a big radius of curvature, a somewhat regular arc shape which has a big radius of curvature, a somewhat regular arc shape which has a small radius of curvature, a somewhat triangular shape, and a somewhat isosceles trapezoidal shape.

3. A solid end mill comprising:
   a tool main body being approximately cylindrical in cross-section with a cylindrical outer periphery being defined by a core thickness circle, having a central longitudinal axis, and being rotatable about said central longitudinal axis in a rotational direction;
   a chip discharge flute located radially outwardly of said core thickness circle of said tool main body between adjacent ones of said at least first and second cutting members, said chip discharge flute including a flute bottom being somewhat flat, located approximately tangent to said core thickness circle of said tool main body, and being connected to a wall surface constituting a rake face, wherein said rake face includes a concave portion adjacent to a concavely curved portion such that said wall surface would define an approximately smoothly curved surface from an end of said flute bottom to said concavely curved portion except for said concave portion being recessed into said concavely curved portion; and
   a cutting edge formed at a ridge portion between said rake face of said chip discharge flute a flank face of said cutting member.

4. The solid end mill of claim 3, wherein said concave portion has a concave shape selected from a group consisting of an arc shape, a sideways-U or "⊃" shape, and a sideways-V or ">" shape.

5. The solid end mill of claim 1, wherein said convex portion is somewhat shaped as a mathematical brace or "{".

6. The solid end mill of claim 1, wherein said convex portion has a shape of a tip of a trapezoid in cross-section.

7. The solid end mill of claim 2, wherein when said convex portion is selected to be of said somewhat regular arc shape which has a big radius of curvature, and a gap or clearance is formed between said convex portion and said flute bottom of said chip discharge flute and between said convex portion and said concavely curved portion.

* * * * *